US006542874B1

(12) United States Patent
Walker et al.

(10) Patent No.: US 6,542,874 B1
(45) Date of Patent: Apr. 1, 2003

(54) METHOD AND APPARATUS FOR SELLING SUBSCRIPTIONS TO PERIODICALS IN A RETAIL ENVIRONMENT

(75) Inventors: Jay S. Walker, Ridgefield, CT (US); Sanjay K. Jindal, Wilton, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/073,082

(22) Filed: May 5, 1998

Related U.S. Application Data

(62) Division of application No. 08/841,791, filed on May 5, 1997, now Pat. No. 5,926,796.

(51) Int. Cl.[7] ............................................. G06F 17/60
(52) U.S. Cl. .......................................... 705/23; 705/16
(58) Field of Search ........................... 705/16, 23, 17; 235/375, 381

(56) References Cited

U.S. PATENT DOCUMENTS

| 3,890,461 A | 6/1975 | Vogelman et al. | |
| 4,253,157 A | 2/1981 | Kirscher et al. | 364/900 |
| 4,276,598 A | 6/1981 | Inoue et al. | |
| 4,484,217 A | 11/1984 | Block et al. | |
| 4,723,212 A | 2/1988 | Mindrum et al. | |
| 4,833,609 A | 5/1989 | Grulke, Jr. | |
| 4,910,672 A | 3/1990 | Off et al. | |
| 4,947,028 A | 8/1990 | Gorog | |
| 4,984,155 A | 1/1991 | Geier et al. | |
| 5,173,851 A | 12/1992 | Off et al. | |
| 5,235,415 A | 8/1993 | Bonicel et al. | |
| 5,324,922 A | 6/1994 | Roberts | 235/375 |
| 5,413,341 A | 5/1995 | Lieberman | |
| 5,415,264 A * | 5/1995 | Menoud | 194/217 |
| 5,428,606 A | 6/1995 | Moskowitz | 370/60 |
| 5,521,364 A | 5/1996 | Kimura et al. | |
| 5,528,490 A | 6/1996 | Hill | |
| 5,544,040 A | 8/1996 | Gerbaulet | |
| 5,612,868 A | 3/1997 | Off et al. | |
| 5,630,103 A | 5/1997 | Smith et al. | 395/500 |
| 5,694,546 A | 12/1997 | Reisman | 395/200.9 |
| 5,794,210 A | 8/1998 | Goldhaber et al. | 705/14 |
| 5,832,457 A | 11/1998 | O'Brien et al. | |
| 5,926,796 A | 7/1999 | Walker et al. | 705/16 |
| 6,014,641 A | 1/2000 | Loeb et al. | 705/34 |
| 6,021,390 A | 2/2000 | Satoh et al. | 705/1 |
| 6,229,879 B1 | 5/2001 | Walker et al. | 379/88 |
| 6,317,723 B1 | 11/2001 | Walker et al. | 705/16 |
| 6,334,112 B1 | 12/2001 | Walker et al. | 705/23 |
| 6,334,113 B1 | 12/2001 | Walker et al. | 705/23 |

FOREIGN PATENT DOCUMENTS

| FR | 2 757 656 A1 | 6/1998 |
| JP | 7-231309 | 8/1995 |

OTHER PUBLICATIONS

Brochure Describing Subscription Kiosk, entitled "Magazine Subscription Sales Center: Where Buying Subscriptions is Easy!," by Interactive Magazine Sales, Inc., New York, NY (undated).

Liz Horton, Holiday Gift Subs Up, Some Due to Novel Promotions, Folio, Feb. 1, 1992, at 39.

Jan Jabsen, Magazine Gift–Giving Made Simple at Retail Outlets, Folio's Publishing News, Feb. 15, 1991, at 15.

Pat Guy, A Gift Off the Rack: Mag Subscription, USA Today, Dec. 19, 1990, at 2B.

(List continued on next page.)

Primary Examiner—Jeffrey D. Carlson
(74) Attorney, Agent, or Firm—Dean P. Alderucci

(57) ABSTRACT

A retail subscription system receives one or more subscription cards indicating that subscriptions to periodicals were sold. The retail subscription system verifies the subscriptions by reference to its own databases and to codes on the subscription cards, and transmits the subscriptions to a fulfillment house for distribution if the codes are determined valid.

9 Claims, 17 Drawing Sheets

OTHER PUBLICATIONS

Tretorn Offers Magazine Promo, Adweek, May 1, 1995, available in LEXIS, News Library, Adweek File.
Diane Reese, Revitalizing Single–Copy Sales, Folio, Feb. 1986, at 84.
Walter Joyce, Muscular Merchandising, Folio, Jun. 1986, at 124.
Wally Wood, Circulation Marketing: Let Your Magazine Do the Selling, Folio, Jun. 1985, at 78.
Jennifer Howland, National Distributors: Scanning the Future, Folio, Feb. 1985, at 69.
Barbara Love, Folio: Plus Circulation, Folio, Jan. 1995, at 159.
Jenna Schnuer, A World without Magazines?, Folio, Jun. 1, 1996, at 16.
Diane Cyr, Distribution Woes, Folio, Jan. 1995, at 170.
Mark Adams, Capell Reports Sales Drop at Newsstands, Mediaweek, Mar. 11, 1996, at 27.
Ann Marie Kerwin, Notably at the Newsstand: Instyle, Financial World Push for Greater Single–Copy Sales, Inside Media, Feb. 7, 1996, at 26.
Lambeth Hochwald, Circulation Secrets: Nine Steps to a Successful Circulation Launch Strategy, Folio, Feb. 1, 1996, at 53.
The Super Subs, Precision Marketing, Oct. 24, 1994, at 23.
Lambeth Hochwald, Postal Blues; Circulators Cope with the Rate Crunch, Folio, May 1, 1995, at 54.
Jenna Schnuer, Overnight Options Add to Distribution Mix, Folio, Mar. 1, 1995, at 19.
David Garratt, What Premium on On–Cover Premiums, Folio, Oct. 1, 1995, at 53.
HFS Incorporated and Hachette Filipacchi Magazines, Business Wire, Nov. 20, 1995, available in LEXIS, Business and Financial Library, Bwire File.
Steve Wilson, Directory Assistance: A Buyer's Guide Can Give You a Big Boost in Revenue and Attract New Advertisers and Subscribers, Folio, Oct. 1, 1995, at 40.
Paul Miller, Magazine Deal Lacks Catalog Appeal, Folio, Jun. 15, 1995, at 30.
Anne Graham, Nonmember Subs —or Not?, Folio, Jun. 1, 1995, at 47.
Steve Wilson, Out of Print —But Not Business, Folio, May 1, 1995, at 22.
Abstract, Lotto World, Mediaweek, May 8, 1995, at 16, available in Dialog, IAC Trade and Industry Database.
Scott Donaton, Gift Subscriptions Find Retail Niche, Advertising Age, Jul. 16, 1990 at 37.
Kelly, Keith J., "Publishers pine for cyber–profits", Advertising Age, Mar. 13, 1995, vol. 66, Issue 11, p. S–22, ISSN: 0001–8899.
"Magazine Subscription Sales Center –Where buying subscriptions is easy!", Customer Service Information, Interactive Magazine Sales, Inc, Email: aim@panix com.
Howland, Jennifer, "National distributors: scanning the future.", Folio: The Magazine for Magazine Management, Feb. 1985, vol. 14, p. 69, ISSN: 0046–4333.
"Phoenix Papers to Sell Merchandise to Build Awareness", Editor & Publisher, Sep. 17, 1988, vol. 121, Issue 38, p. 23, ISSN: 0013–094X.
Guy, Pat, "A gift off the rack: Mag subscription", USA Today, Dec. 19, 1990, Section: Money at p. 2B.
Carlson, Lynn, "Decreasing Your Direct–Mail Costs", Folio: The Magazine for Magazine Management, Sep. 1, 1992, vol. 21, Issue 9, pp. 81–82, ISSN: 0046–4333.
Manly, Lorne,"A newsstand for the electrionic age", Folio: The Magazine for Magazine Management, Sep. 15, 1993, vol. 22, No. 16, p. 17, ISSN: 0046–4333.
Hochwald, Lambeth, "Sub sources that break with tradition", Folio: The Magazine for Magazine Mangement, May 1, 1994, vol. 23, Issue 8, pp. 46–48, ISSN: 0046–4333.
Kelly, Keith J., "Hearst opens a cyberspace newsstand", Advertising Age, Jan. 30, 1995, vol. 66, Issue 5, p. 14, ISSN: 0001–8899.
Hearst Corporation launches The Multimedia Newsstand, Link–Up, Mar./Apr. 1995, vol. 12, Issue 2, pp. 1, 36, ISSN: 0739–988X.
"Tretorn Offers Magazine Promo", Adweek, May 1, 1995, Section: Newswire.
"Lotto World", Media Week, May 8, 1995, vol. 5, No. 19, at p. 16(1).
Hodges, Jane, "'WSJ puts squeeze on Web subscriptions", Adverstising Age, Apr. 29, 1996, vol. 67, Issue 18, p. 34, ISSN: 0001–8899.
Tedesco, Richard, "Time launches Net subscription service", Broadcasting & Cable, Nov. 11, 1996, vol. 126, Issue 47, p. 65, ISSN: 1068–6827.
Case, Tony, "The electronic newsstand branches out", Folio: The Magazine for Magazine Management, Apr. 1, 1997, vol. 26, Issue 5, p. 13, ISSN: 0046–4333.
Krol, Carol, "Magazine site to focus on commerce", Advertising Age, Aug. 18, 1997, vol. 68, Issue 33, p. 18, ISSN: 0001–8899.

* cited by examiner

LOCAL SUBSCRIPTION DATABASE 342

| PERIODICAL NAME | TERM | PRICE |
|---|---|---|
| TIME | 12 MONTHS | $20 |
| TIME | 24 MONTHS | $38 |
| | | |

FIG. 5

RETAIL SUBSCRIPTION SYSTEM SUBSCRIBER DATABASE 442

| STORE ID# | DATE | SUBSCRIBER NAME | SUBSCRIBER ADDRESS | PERIODICAL NAME | TERM | AUTHENTICATION CODE | # ISSUES |
|---|---|---|---|---|---|---|---|
| 1234 | 3/30/97 | JOHN DOE | 1 MAIN STREET TOWN, CT | TIME | 6 | 349AZXW 968 | 11 |
| | | | | | | | |
| | | | | | | | |

FIG. 8

RETAIL SUBSCRIPTION SYSTEM AUTHENTICATION CODE DATABASE 444

○ YES! SEND ME 1 YEAR (12 ISSUES) OF
BUSINESS WEEK MAGAZINE FOR ONLY $19.94

○ PAYMENT ENCLOSED    ○ BILL ME

NAME _____

ADDRESS _____

CITY_____ STATE_____ ZIP _____

ALLOW 4-8 WEEKS FOR DELIVERY

FIG. 11

```
DECEMBER 15, 1997            SALES RECEIPT # 3478

BOOKS/MAGAZINES STORE

GONE WITH THE WIND                      $11.00

BRIDGES OF MADISON COUNTY                 7.00

TIME MAGAZINE                             4.00

SUBSCIPTION - 12 MONTHS                  16.00

TAX                                       1.25
                                   _____
TOTAL                                   $39.25

PLEASE CALL 1-800-XXX-XXXX WITH ANY QUESTIONS
          REGARDING THIS SUBSCRIPTION

AUTHENTICATION CODE             349AZXW968

BOOKS/MAGAZINES STORE
```

FIG. 12

METHOD AND APPARATUS FOR SELLING SUBSCRIPTIONS TO PERIODICALS IN A RETAIL ENVIRONMENT

CROSS-REFERENCE TO RELATED APPLICATIONS

This application is a divisional of co-pending U.S. patent application Ser. No. 08/841,791 entitled "Method And Apparatus For Selling Subscriptions To Periodicals In A Retail Environment" filed May 5, 1997. now U.S. Pat. No. 5,926,796

BACKGROUND OF THE INVENTION

1. Field of the Invention

The present invention relates to a system for the distribution of periodicals. More particularly, the invention relates to a method and apparatus for facilitating the sale and fulfillment of a subscription to at least one periodical through retail channels.

2. Description of the Related Art

Each year, over one billion single-issue copies of magazines are sold through over 50,000 retail outlets in the United States. The cost of a single issue, or the "cover price," is often two or three times higher than the pro rata price of a single issue through a subscription. Despite the higher prices, consumers are, willing to purchase single issues from retail outlets because of convenience and timeliness.

Some consumers decide to forgo the advantages of newsstand copies and purchase subscriptions to periodicals. For example, if a consumer wishes to subscribe to a magazine, the consumer may purchase a single issue at a retail outlet and mail back a "blow-in" or "bind-in" card enclosed in the magazine issue. Publishers place blow-in subscription cards by loosely inserting the cards into periodicals, such as magazines, by air injection. Publishers insert bind-in cards into the periodicals by, for example, binding subscription cards into issues during the printing process. Publishers use these methods to sell subscriptions because of the potential profits earned thereon. Nevertheless, many inconveniences arise from the traditional methodologies, which do not promote, and in fact hinder, customers of single issues from subscribing to the periodicals.

One such inconvenience involves lost sales to the retailer. Retailers carry single-issue periodicals predominantly for impulse purchases. However, if a consumer purchases a single-issue periodical at a retail outlet and then subscribes to the periodical by a blow-in or bind-in card, the retailer earns no additional revenue from the subscription. In addition, subscription cards contained in retail copies encourage consumers to buy a subscription that deprives the retailer of potential revenue from future single-issue sales to that customer. Thus, retailers have no incentive to encourage purchasers of single issues to purchase subscriptions.

Several other inconveniences affect the consumer. For example, the initiation of a subscription by a blow-in or bind-in subscription card requires much time and patience on the part of the consumer. Such a subscription frequently takes weeks for processing. Indeed, federal rules require, when appropriate, that magazine publishers denote a waiting time disclaimer: "Allow 4–8 weeks for your first issue to be mailed." In addition, due to processing and delivery delays, the consumer may not actually receive the first issue of the magazine until twelve weeks from the date of subscription. The uncertainty of when the first issue of the subscription will arrive often results in missed issues. In addition, purchasing subscriptions using subscription cards creates a risk of loss to the consumer because the consumer must deposit the subscription card in the mail, after which the consumer has no record or invoice of the transaction.

Still other inconveniences for the consumer arise from the method of payment. Payment under the traditional subscription method constitutes an inconvenience for the consumer because the only way to enclose payment with a blow-in or bind-in subscription card requires that the consumer enclose the card and payment in an envelope with accompanying postage. Even if a toll-free number is provided for initiating the subscription, the call itself inconveniences the consumer. Furthermore, if payment is not made at the time of ordering, a two-step process is required: first, the submission of the blow-in or bind-in card, and second, the payment of a bill. This two-step ordering process is not only inefficient but also wastes the consumer's valuable time. In paying the bill, moreover, the consumer must again correspond with the magazine publisher, paying an invoice by check and returning the payment by mail. Due to processing and delivery delays, the consumer may even receive multiple invoices of the bill, even though payment has already been made. These incidents of inefficiency not only inconvenience the consumer and increase the costs and efforts of the magazine publisher, but also jeopardize the goodwill of the magazine in the consumer's mind.

Another inconvenience for the consumer regarding the method of payment deals with the inability to pay with cash. There is presently no ready means for a consumer to subscribe to a periodical and pay with cash, except for the enclosure of cash in the mail. The transmittal of cash in the mail, however, presents a threat of loss—even the United States Postal Service warns consumers against sending cash through the mail. This inconvenience is particularly meaningful because some consumers may not wish to pay for a subscription to a controversial magazine by check or credit card, as these forms of payment serve as records of the transaction.

Still another inconvenience for the consumer in dealing with the method of payment involves the cost of the initial single-issue periodical. If a consumer subscribes to a periodical by responding to a blow-in or bind-in subscription card, the consumer loses the benefit of paying the lower subscription price for the first issue. Normally, the consumer initially purchases the single-issue periodical at full price, after which he pays the discounted price for the subscription. Thus, even when the consumer chooses to subscribe to a periodical following a single-issue purchase, the consumer always loses the initial investment of the purchase price of the single issue.

Yet other inconveniences affect the periodical publishers. Under the traditional subscription methodologies, publishers suffer reduced subscription revenues from consumers who might have purchased a subscription at the time they purchased the single-issue periodical at a retail outlet. Because the sale of periodicals at retail outlets depends primarily upon impulse sales, the inability to initiate an instantaneous subscription reduces subscription volume for periodical publishers. Also, outside the retail environment, a consumer may subscribe to a periodical in response to direct correspondence or indirect solicitations through the mail, telephonically, or through electronic means, such as e-mail. Nevertheless, under these circumstances, due to processing and mailing delays, the consumer still has no access to the current issue of the periodical, and the publisher loses these single-issue sales.

The prior art describes several attempts to address the inconveniences surrounding the traditional subscription methodologies. One attempt involved the sale of gift subscriptions at retail outlets. The consumer could purchase a box containing a gift card to be sent to the recipient, a magazine activation card to be sent to a processing center, and the envelopes for both sets of cards. The consumer would send the gift card to the recipient and the activation card to a processing center. The retailer would retain a percentage from the purchase price and remit the balance of the payment to the processing center. Upon receipt of the activation card from the consumer and the payment from the retailer, the processing center would take a percentage from the payment and forward the card and the balance of the payment to the magazine publisher.

This attempt fails to even address, much less overcome, the inconveniences associated with the traditional subscription methodologies. For example, this attempt provided no solution for the lengthy processing time required by the traditional methodologies. Also, this attempt provided no mechanism by which the subscriber could receive the current issue of the periodical as the first issue of the subscription. Furthermore, even if the consumer purchased the current issue concurrently with this attempt, the consumer would still not obtain the benefit of that issue in the subscription price.

Another attempt to overcome the inconveniences of the traditional subscription methodologies included the retail sale of subscriptions at bookstores. The subscriptions were offered as part of a shelf-displayed package placed on a hook. The consumer could purchase one of the packages and subscribe to a periodical by paying for the package at the retail point-of-sale and then sending the pre-paid subscription activation card to the fulfillment house. Still another attempt incorporated the sale of subscriptions at specialty subscription kiosks. These kiosks comprised a computer system utilizing touchscreen technology to enable consumers to select and purchase either a subscription or a gift subscription. The customer could pay for either type of subscription at the kiosk by credit card, and the kiosk would issue a receipt for the transaction. For gift subscriptions, the subscription kiosk would also dispense a gift card. For both types of subscriptions, the kiosks informed consumers of a four-to-eight week delay before the arrival of the first issue.

Again, none of these attempts solved the inconveniences of the traditional subscription methodologies. These attempts both incorporated significant delay due to processing requirements. Indeed, the subscription kiosk attempt specified a four-to-eight week delay. In addition, none of these attempts allowed the consumer to receive the current issue of the periodical with the subscription. Also, the attempts made no provision for a consumer to benefit from a subscription in the price of the current issue.

In all of the above attempts, significantly, the consumer never had the opportunity to purchase a single issue with the subscription, that is, where the subscription included the single issue in the price of the subscription. Indeed, whether or not these attempts were transmitted through a processing center, they all comprised invoice orders for the initiation of a simple subscription. As such, they all suffered at least one common inconvenience associated with the traditional subscription methodologies, namely, the inability to incorporate the current issue as the first issue of a subscription. Additionally, as illustrated above, all the cited attempts also suffered other common inconveniences because they all resulted at least in the loss of a sale of the initial single issue to the retail outlet and they all entailed significant processing delay resulting in a customer not receiving the most current issue of the periodical.

Thus, the traditional methodologies for the subscription to periodicals at retail locations give rise to unsatisfactory complications and inconveniences that discourage consumers from both purchasing a single issue and subscribing to the periodical. Accordingly, there is a need for a system that allows consumers to purchase a single issue and a subscription without the associated inconveniences caused by traditional subscription methodologies.

SUMMARY OF THE INVENTION

The present invention is directed to a subscription method and system that eliminates problems due to the limitations and disadvantages of the prior art.

It is an object of the invention to allow a consumer to purchase a single issue of a periodical as part of and along with a subscription at a retail outlet.

It is another object of the invention to allow a consumer to purchase a subscription to a periodical without missing the current issue of the periodical or paying the full cover price for the current issue.

It is still another object of the invention to encourage sales of subscriptions and provide incentives to retailers to encourage sales of subscriptions.

It is a further object of the invention to allow a consumer to pay cash for a subscription and provide the consumer with a receipt for purchasing the subscription.

To achieve these and other objects, and in accordance with the purposes of the invention, as embodied and broadly described, one aspect of the invention includes a method for establishing a subscription to a periodical, comprising the steps of receiving a request to purchase a single periodical, offering to sell a subscription to the periodical at a subscription rate, receiving an acceptance to the offer to sell a subscription, and providing the single periodical as the first issue of the subscription.

In another aspect, the invention includes a method for establishing a subscription to a periodical at a point-of-sale terminal, comprising the steps of receiving at a point-of-sale terminal a single issue of a periodical, receiving at the point-of-sale terminal a subscription card requesting a subscription to the periodical (the subscription card containing a first set of subscription information), inputting into the point-of-sale terminal a second set of subscription information (the second set including subscription price and term), receiving payment for the subscription, generating a receipt containing the subscription price and term, and providing the single issue as the first issue of the subscription.

In a further aspect, the invention includes a method for initiating a subscription to a periodical from a retail subscription system, comprising the steps of receiving a completed subscription card indicating that a subscription to a periodical was sold (the subscription card containing subscription information and an authentication code), comparing the authentication code contained on the subscription card with authentication codes stored in a database, determining that the authentication code contained on the subscription card is valid if the authentication code contained on the subscription card matches at least one of the authentication codes stored in the database, and transmitting subscription information from the subscription card to a fulfillment house to initiate the subscription if the authentication code on the subscription card is determined valid.

Additional aspects of the invention are disclosed and defined by the appended claims. It is to be understood that both the foregoing general descriptions and the following detailed descriptions are exemplary and explanatory and are intended to provide further explanation of the invention as claimed.

BRIEF DESCRIPTION OF THE DRAWINGS

The accompanying drawings are included to provide a further understanding of the invention. These drawings are incorporated in and constitute a part of this specification, illustrate preferred embodiments of the invention, and together with the description, serve to explain the principles of the invention.

In the drawings:

FIG. 5 illustrates a sample of the contents of the local subscription database stored in the point-of-sale controller shown in FIG. 3;

FIG. 8 illustrates a sample of the contents of the subscriber database from the retail subscription system shown in FIG. 4;

FIG. 11 illustrates a sample of a subscription card utilized by the method illustrated in FIG. 10;

FIG. 12 illustrates a sample of a receipt generated by the method illustrated in FIG. 10;

DETAILED DESCRIPTION OF THE INVENTION

Introduction

The system of the invention avoids the inconveniences of the prior art subscription methodologies by integrating the sale of a subscription along with the sale of a single-issue periodical at a retailer. In doing so, all parties benefit: the customer benefits from a discounted subscription rate on both the single issue and the subscription, the retailer benefits by receiving greater profits for the sale of a subscription over the sale of a single issue, and the publisher benefits by selling another subscription. The system is also useful to retailers because it generates additional sales with no additional inventory cost.

The system of the invention comprises several components including a point-of-sale (POS) terminal, a POS controller, a retail subscription system, and a fulfillment house. The POS terminal allows a cashier to enter sales data, which is stored in the POS controller. The POS controller maintains databases on the available subscriptions and produces databases of the subscriptions sold to customers. The retail subscription system serves as an agent or intermediary between the POS location and any fulfillment house. The retail subscription system verifies the subscriptions by reference to its own databases and, if valid, transmits the subscriptions to the fulfillment house for distribution.

System

Figure 1:
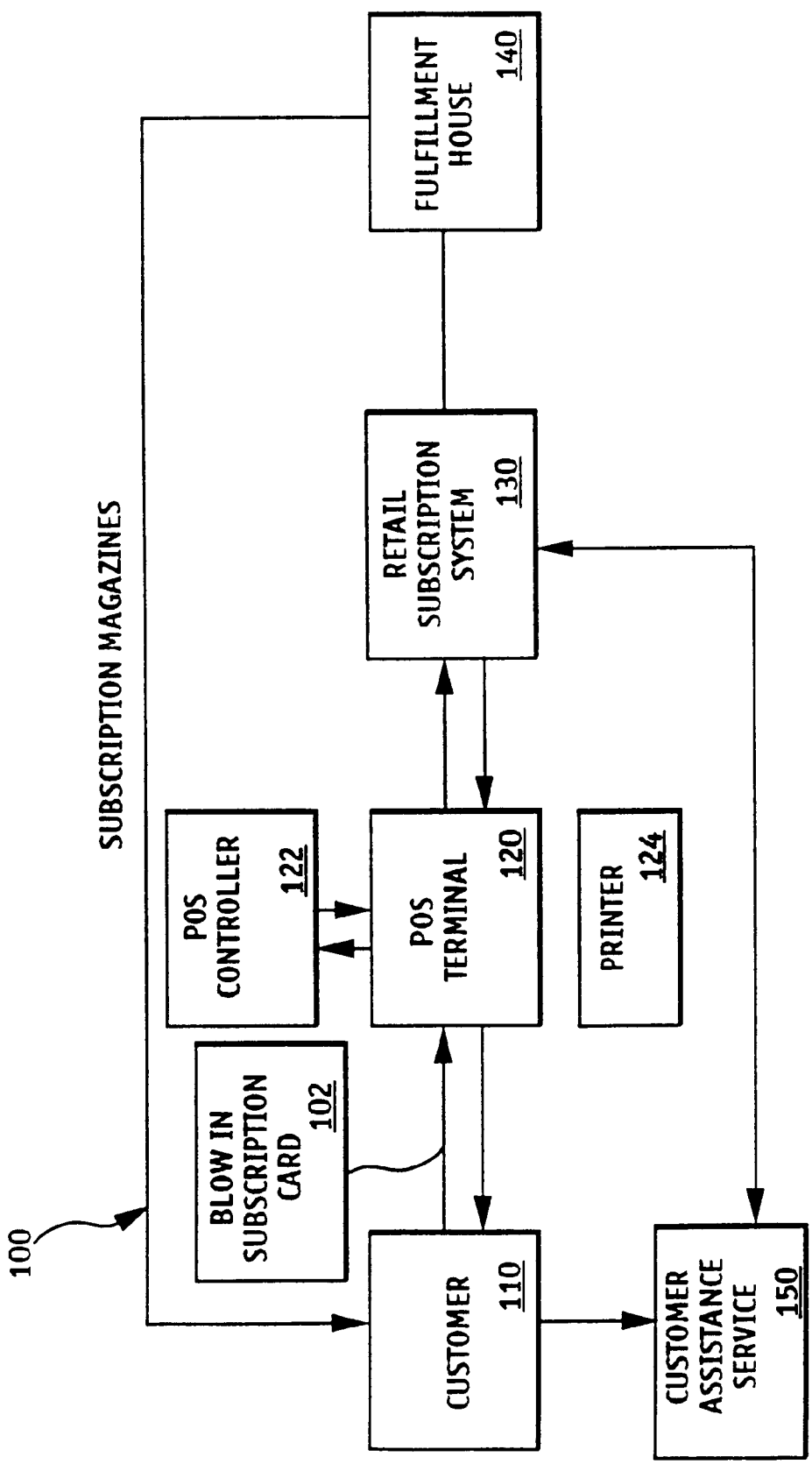
FIG. 1 illustrates a block diagram of a retail subscription system in accordance with one embodiment of the present invention.

FIG. 1 shows one embodiment of the system according to the invention. In this embodiment, system 100 includes POS terminal 120 attached to POS controller 122 and printer 124. Customer 110, who is preferably a consumer planning initially to purchase a single-issue periodical, transacts with a cashier at POS terminal 120 to purchase instead a subscription, and the cashier transacts in turn with retail subscription system 130. Retail subscription system 130 in turn transacts with fulfillment house 140. Fulfillment house 140 comprises a conventional fulfillment house receiving subscription orders and filling them by distributing (e.g., via mail) issues of periodicals.

Customer 110 may access customer assistance service 150 via traditional communication techniques, such as a telephone or digital communication channel. Customer assistance service 150 is in communication, preferably electronic, with retail subscription system 130 such that it can transmit requests for information to and receive requested information from retail subscription system 130 substantially in real-time. Customer 110 may utilize customer assistance service 150 to obtain answers to questions involving a subscription.

Figure 2:
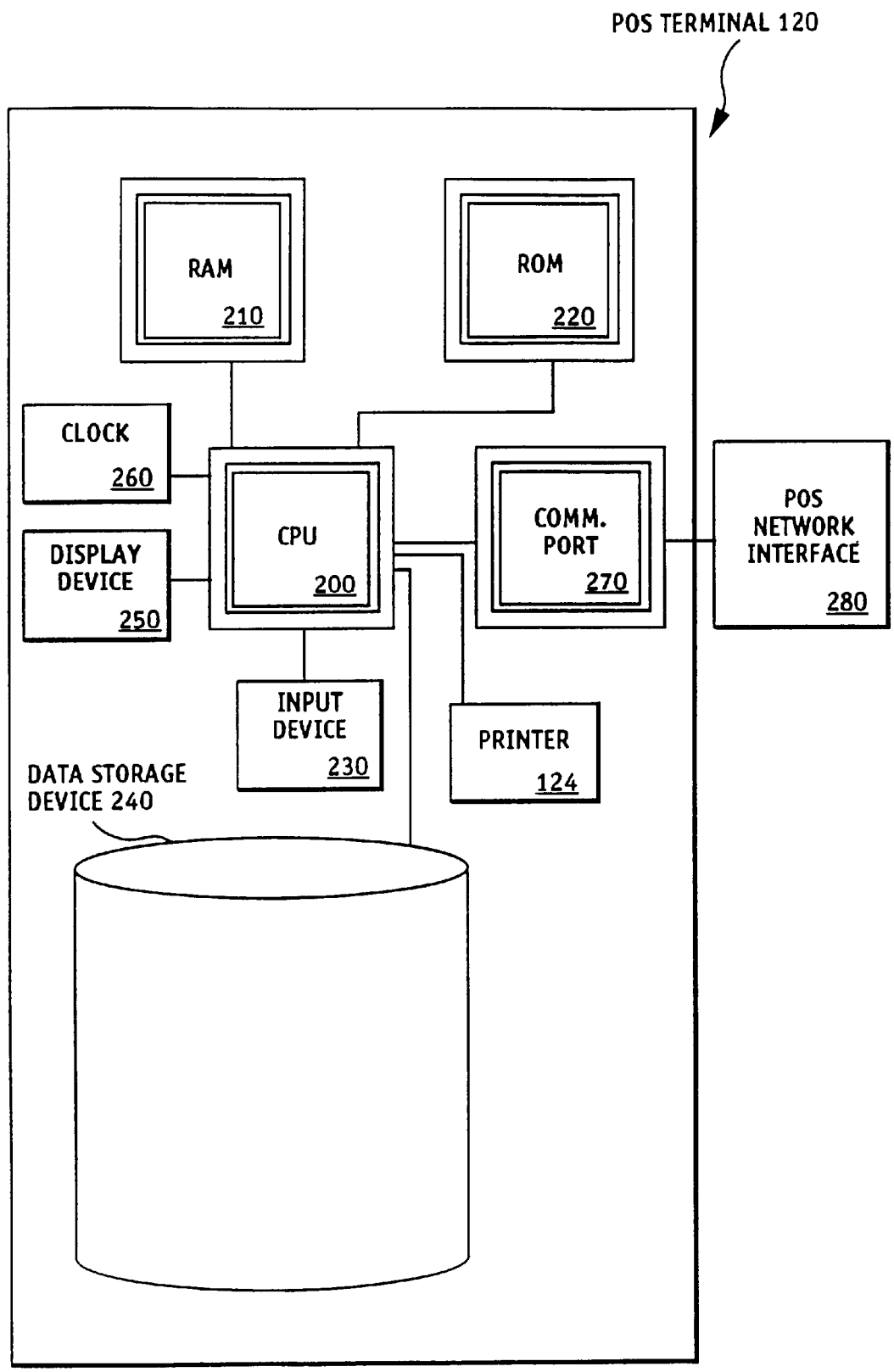
FIG. 2 illustrates a block diagram of a point-of-sale terminal, as shown in FIG. 1.

FIG. 2 illustrates one embodiment of POS terminal 120 used in system 100 shown in FIG. 1. As shown in FIG. 2, POS terminal 120 includes central processing unit (CPU) 200, random access memory (RAM) 210, read-only memory (ROM) 220, at least one data input device 230, data storage device 240, display device 250, clock 260, communication port 270, and POS network interface 280. Although printer 124 is illustrated in FIG. 1 as a separate element of POS terminal 120, as illustrated in FIG. 2, printer 124 could also be incorporated into POS terminal 120 in alternative embodiments. POS terminal 120 basically functions as a conventional digital cash register equipped with the additional functionality described herein.

As shown in FIG. 2, CPU 200 is directly coupled to each of the other elements of POS terminal 120 with the exception of POS network interface 280, which is coupled to communication port 270. CPU 200 executes program code (not shown) stored in one or more of RAM 210, ROM 220, and data storage device 240 to carry out the functions and acts described in connection with POS terminal 120. CPU 200 preferably comprises at least one high-speed digital data processor adequate to execute program modules consistent with the invention, such as periodical subscription query, sale, and authentication, as well as conventional POS terminal functions. The processes performed by these modules are described in connection with FIGS. 10–16. CPU 200 interacts with RAM 210, ROM 220, and storage device 240 to execute stored program code according to conventional data processing techniques.

Data input device 230 permits POS terminal 120 to receive subscription information about customer 110 and, although shown as a single device, may comprise one or more data input devices of various types, such as an alphanumeric keyboard, a numeric keypad, a bar code scanner, a credit card reader, a disk drive, a memory, an electronic communication line, and a wireless transceiver. Input device 230 preferably transmits received information to CPU 200 for storage in data storage device 240.

Printer 124 comprises a conventional POS terminal printer suitable for printing various paperwork, such as receipts, in accordance with instructions from CPU 200. Display device 250 comprises a video driver sending signals to a screen capable of displaying either text or graphics under the control of CPU 200. Display device 250 is preferably large enough to display information relating to general sales, as well as subscription sales, to the cashier. Communication port 270 links CPU 200 with POS network interface 280 to allow CPU 200 to communicate with other POS devices, such as POS controller 122.

Figure 3:
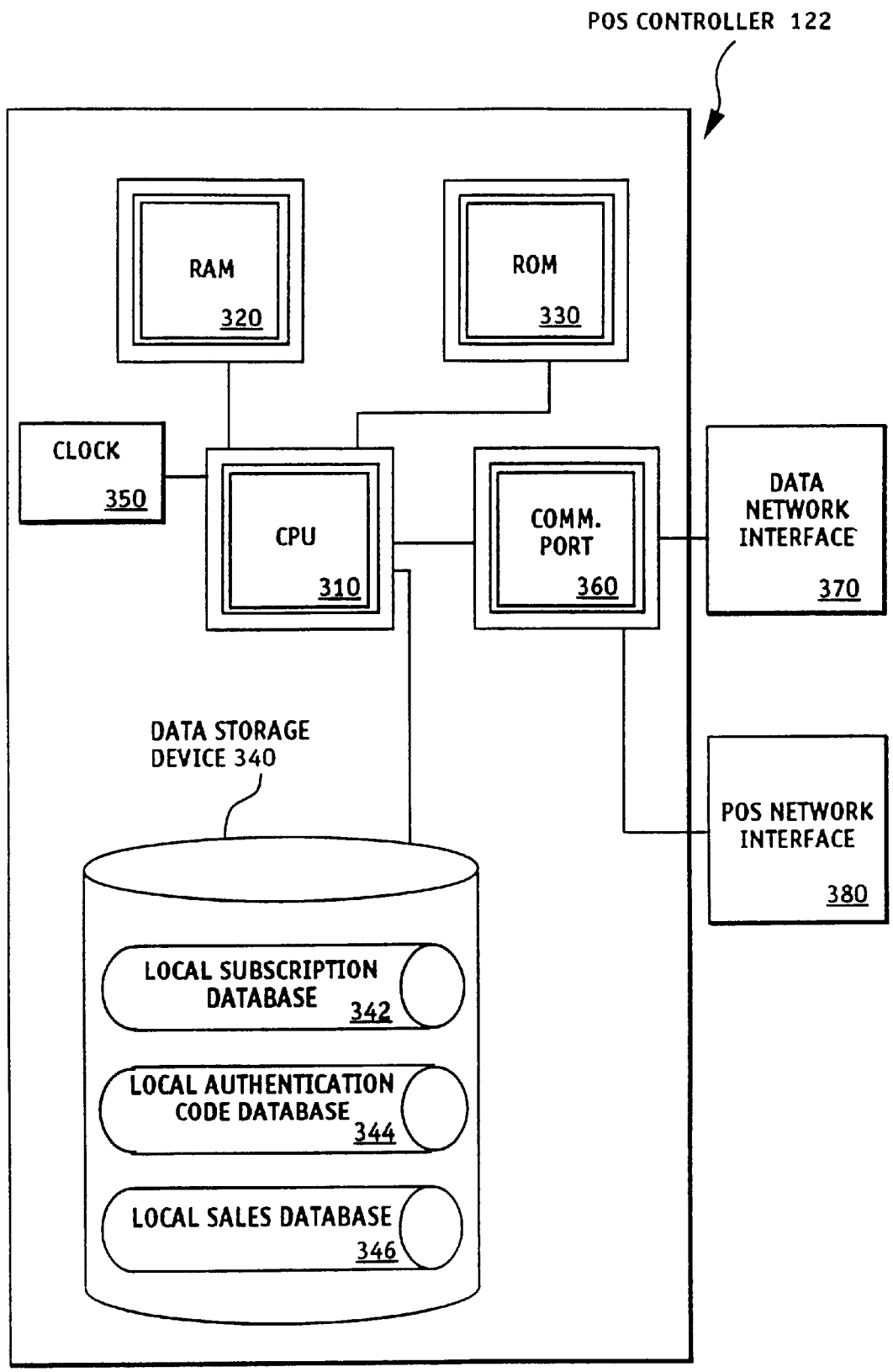
FIG. 3 illustrates a block diagram of a point-of-sale controller, as shown in FIG. 1.

FIG. 3 illustrates one embodiment of POS controller 122 used in system 100. POS controller 122 preferably comprises a server equipped with conventional hardware, including CPU 310, RAM 320, ROM 330, data storage device 340, clock 350, communications port 360, data network interface 370, and POS network interface 380. In general, elements of POS controller 122 common to POS terminal 120 preferably operate in substantially the same manner as described above.

Because POS controller 122 may service one or more POS terminals, POS network interface 380 is preferably capable of interfacing with one or more POS terminals.

Data network interface 370 allows POS controller 122 to interface with other data networks. In one embodiment, data network interface 370 links POS controller 122 with retail subscription system 130 to facilitate electronic communication. In alternative embodiments, POS controller 122 does not include data network interface 370 so that systems and networks other than POS terminals linked to POS network interface 380 are unable to access POS controller 122. In these alternative embodiments, communication between POS controller 122 and retail subscription system 130 could occur by physical delivery, such as the mail.

Data storage device 340 preferably comprises a large capacity memory capable of maintaining local subscription database 342, local authentication code database 344, and local sales database 346. Local subscription database 342 contains data pertaining to the periodicals to which subscriptions are available at the POS terminal location. Local authentication code database 344 contains a table of authentication codes available for verifying subscription sales. Local sales database 346 comprises a listing of information relating to subscription sales. In a preferred embodiment, data contained in one or more of these databases 342, 344, and 346 may be periodically updated by transferring the updated data to POS controller 122 via disk, input device, or electronic transmission. Samples of the records and their respective fields contained in databases 342, 344, and 346 are shown in and described in connection with FIGS. 5–7.

Figure 4:
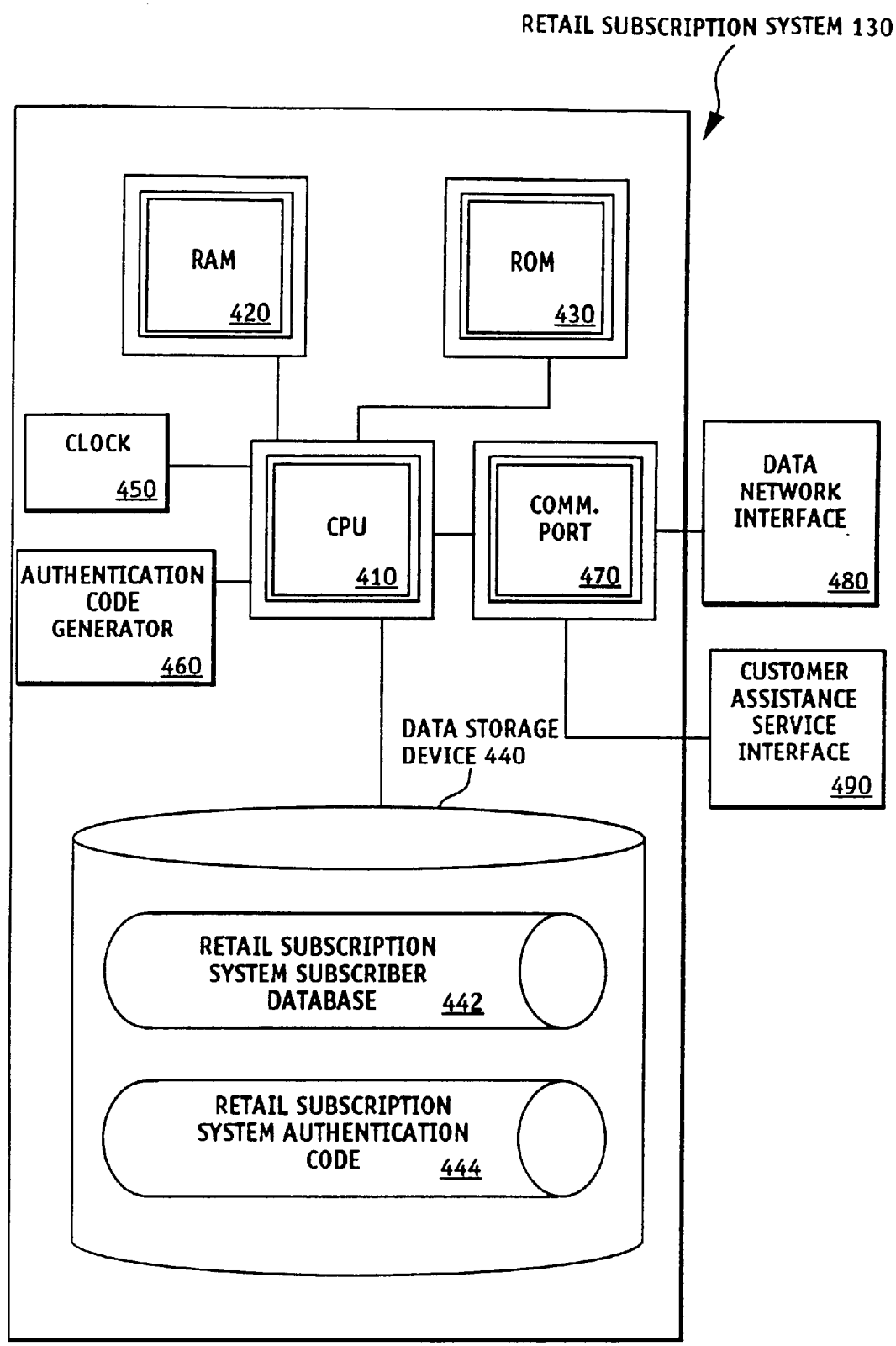
FIG. 4 illustrates a block diagram of a retail subscription system, as shown in FIG. 1.

FIG. 4 illustrates one embodiment of retail subscription system 130 used in the system shown in FIG. 1. As shown in FIG. 4, retail subscription system 130 includes CPU 410, RAM 420, ROM 430, data storage device 440, clock 450, communications port 470, data network interface 480, and customer assistance service interface 490. Again, elements of retail subscription system 130 common to POS terminal 120 or POS controller 122 preferably operate in substantially the same manner as described above.

Communication port 470 links retail subscription system 130 with data network interface 480, which interfaces system 130 to external networks. In a preferred embodiment, one such external network is POS controller 122. Customer assistance service interface 490 preferably interfaces retail subscription system 130 with customer assistance service 150. In this embodiment, customer assistance service interface 490 provides access to customer assistance service 150 at retail subscription system 130.

Data storage device 440 maintains retail subscription system (RSS) subscriber database 442 and retail subscription system authentication code (RSSAC) database 444. RSS subscriber database 442 stores subscription information transmitted from the retailer. RSSAC database 444 contains a list of authentication codes used to validate subscription sales. Authentication code generator 460 generates the authentication codes, which preferably represent unique alphanumeric identifiers. In a preferred embodiment, authentication code generator 460 includes a pseudo-random number generator used to select a sequence of alphanumeric characters having a predetermined length. Samples of the records and their respective fields contained in RSS subscriber database 442 and RSSAC database 444 are shown in and described in connection with FIGS. 8 and 9.

Database Formats

Samples of the contents of local subscription database 342, local authentication code database 344, local sales database 346, RSS subscriber database 442, and RSSAC database 444 are shown in FIGS. 5–9. The specific data and fields illustrated in these figures represent only one embodiment of the records stored in the databases of the invention. In most cases, the fields shown in FIGS. 5–9 are relatively straightforward and self-explanatory. The data and fields of these databases, as well as the number of databases, can be readily modified from the described embodiment, for example, to include more or fewer data fields.

Local subscription database 342 maintained in POS controller 122 contains a listing of information relating to periodicals to which customer 110 may obtain a subscription at a retailer (e.g., POS terminal 120). FIG. 5 illustrates a sample of the contents of local subscription database 342. As shown in FIG. 5, local subscription database 342 contains records having fields corresponding to, for example, the name of the periodical, the term of subscription, and the price of the subscription. As depicted in FIG. 5, the listing of periodicals may contain different records relating to the same periodical, each record having a different subscription term and price.

Figure 6:
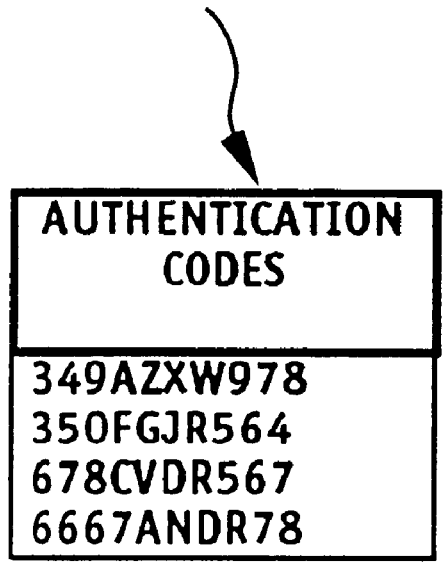
FIG. 6 illustrates a sample of the contents of the local authentication code database from the point-of-sale controller shown in FIG. 3.

Local authentication code database 344 contains a listing of authentication codes available for use by POS controller 122 for subscription sales. Each authentication code preferably comprises a unique alphanumeric identifier of a predetermined length, though the code length could vary in alternative embodiments. FIG. 6 illustrates a sample of the contents of local authentication code database 344. As shown in FIG. 6, local authentication code database 344 contains a list of authentication codes, which may be contained in a single or multiple records.

Figure 7:
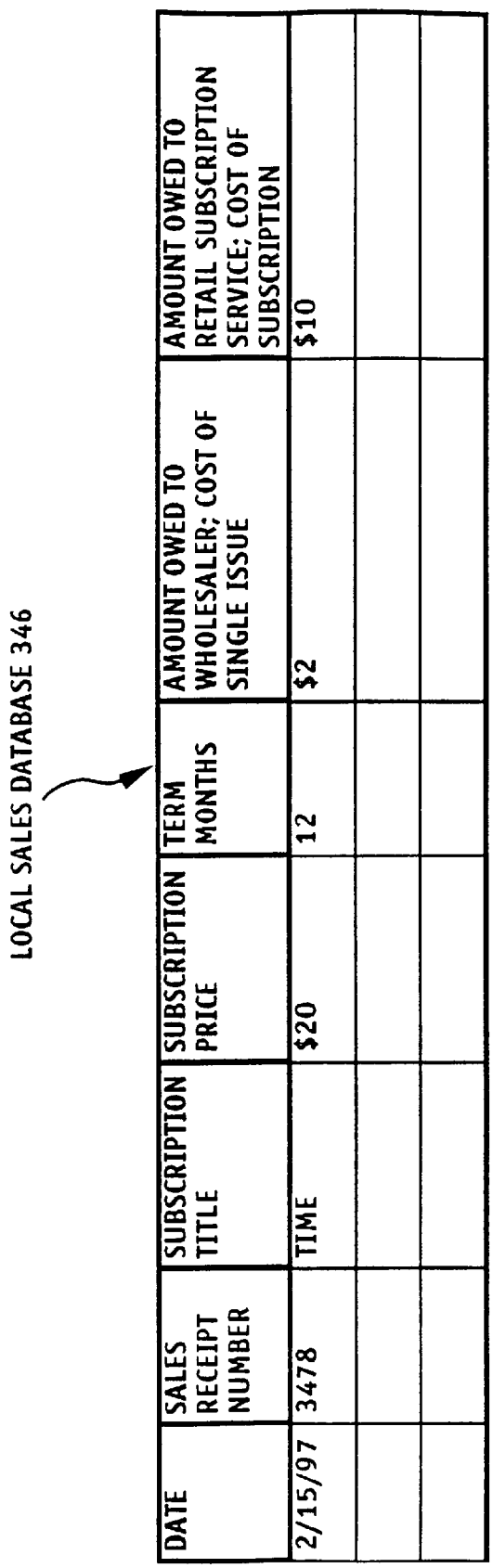
FIG. 7 illustrates a sample of the contents of the local sales database from the point-of-sale controller shown in FIG. 3.

Local sales database 346 maintains a log of information relating to the subscriptions ordered by customers, such as customer 110. FIG. 7 illustrates a sample of the contents of local sales database 346. As shown in FIG. 7, local sales database 346 contains records having fields corresponding to, for example, date, sales receipt number, subscription title, subscription price, term of the subscription in months, the amount owed to the wholesaler for the cost of a single issue, and the amount owed to retail subscription system 130 for the cost of a subscription. These last two fields describe the difference between the subscription price and the amount of money retained by the point-of-sale location. For example, as illustrated in FIG. 7, if the price of the subscription is $20, and if the cost of the single issue is $2, and if the cost of the subscription is $10, then the point-of-sale location retains $8 from the subscription price (ie., the subscription price charged the customer less the cost of the single issue remitted to the wholesaler and less the cost of the subscription remitted to the retail subscription system). For all of these fields, from the data in this database as well as the data stored in other databases (e.g., local subscription database 342), the data for the corresponding fields can be readily calculated. Additionally, the designated fields may be appended for greater functionality. For example, the records stored in local sales database 346 could be modified to contain additional fields, such as subscriber name and subscriber address.

The use of data from local subscription database 342, local authentication code database 344, and local sales database 346 allows POS controller 122 to process subscriptions from POS terminals 120 as described below.

Upon receiving subscription information from POS controller 122, retail subscription system 130 places the information in subscriber database 442. FIG. 8 illustrates a sample of the contents of subscriber database 442. As shown in FIG. 8, subscriber database 442 contains records having fields corresponding to, for example, the store identification number, date, subscriber name, subscriber address, periodical name, term of subscription, authentication code, and number of issues remaining in the subscription. In one embodiment, an operator at retail subscription system 130 receives completed subscription cards corresponding to paid subscriptions and enters information from the subscriptions cards into retail subscription system 130. In an alternative embodiment, POS controller 122 electronically transmits subscription information via data network interface 370 to retail subscription system 130 via data network interface 480.

Figure 9:
FIG. 9 illustrates a sample of the contents of the authentication code database from the retail subscription system shown in FIG. 4.

RSSAC database 444 contains information allowing retail subscription system 130 to verify the authenticity of the authentication codes transmitted by POS controller 122. FIG. 9 illustrates a sample of the contents of RSSAC database 444. As shown in FIG. 9, RSSAC database 444 contains records having fields corresponding to, for example, store identification number and authentication codes. Each store identification number is preferably associated with a different retailer and is assigned a plurality of authentication codes. In one embodiment, RSSAC database 444 indexes the stored authentication codes by store identification number. Retail subscription system 130 can therefore verify the authenticity of an authentication code transmitted from POS controllers 122 by comparing the received authentication code with the contents of RSSAC database 444.

The use of data from subscriber database 442 and RSSAC database 444 allows retail subscription system 130 to process subscriptions transmitted from POS controller 122 and verify the subscription sales.

Process

In providing a subscription to a periodical in response to a sale of a single issue, the system shown and described in connection with FIG. 1 preferably executes several distinct modules, or processes. These processes include facilitating the sale of a subscription at a POS terminal location, transmitting subscription information to a retail subscription system, and transmitting subscription information to a fulfillment house. The steps associated with these processes are described in connection with FIGS. 10–16 and can be performed in any order, unless otherwise specified or dictated by the steps themselves.

Figure 10:
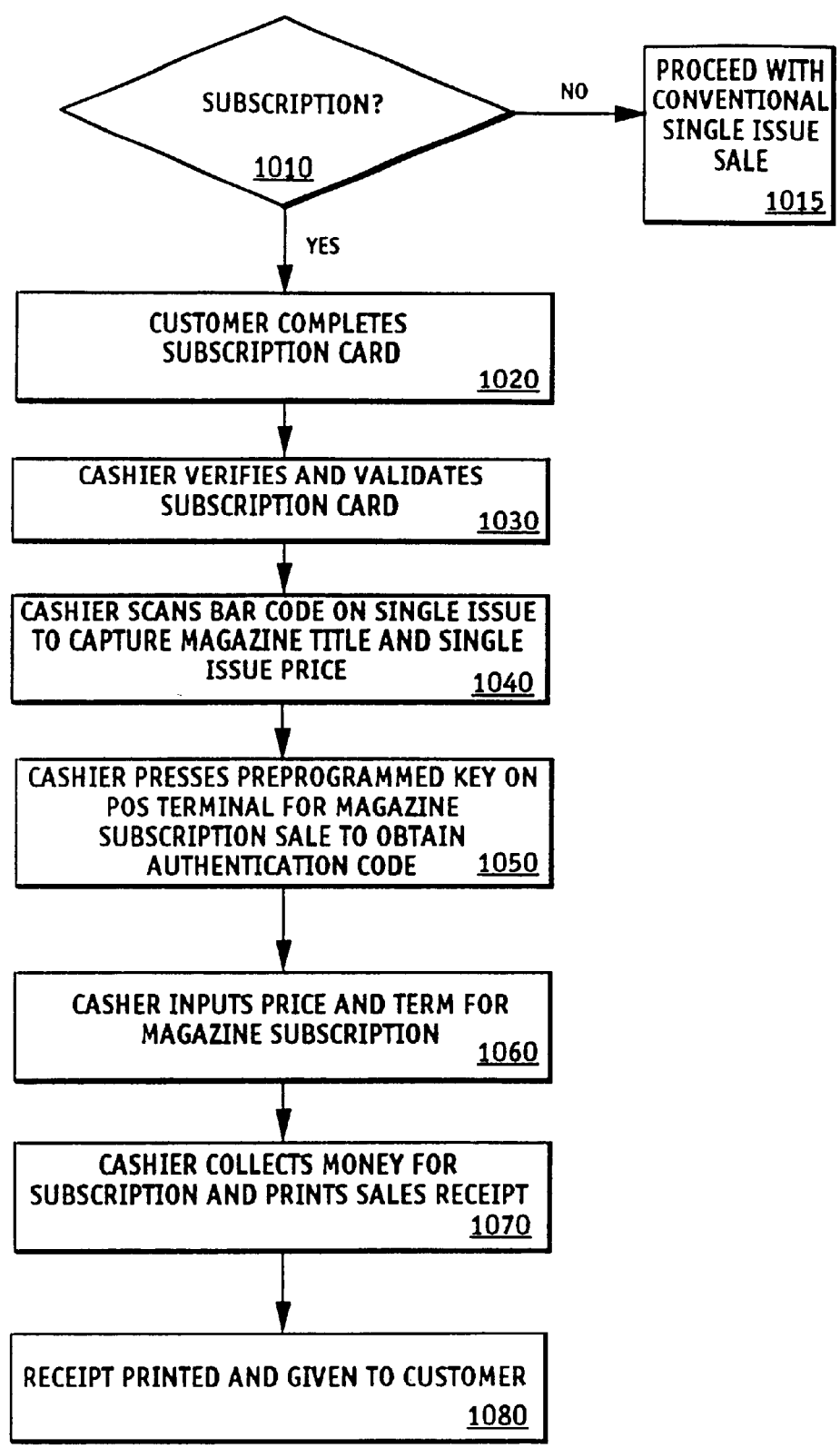
FIG. 10 illustrates a flow diagram of a method for establishing a subscription through a retail channel, in accordance with a first embodiment of the invention.

One embodiment of the sale of a subscription at a POS location involves a series of steps illustrated in the flow diagram of FIG. 10. After a customer 110 selects a single issue of a periodical for purchase, a cashier at POS terminal 120 queries customer 110 as to whether customer 110 desires to purchase a subscription to that periodical (step 1010). If customer 110 declines the subscription, the cashier at POS terminal 120 proceeds with a conventional sale of the single issue (step 1015). If customer 110 accepts a subscription, customer 110 completes a subscription card, which customer 110 returns to the cashier at POS terminal 120 (step 1020). Customer 110 preferably obtains a subscription card from within the single issue (i.e., a blow-in card or a bind-in card). Alternatively, the cashier may provide a comparable subscription card to customer 110.

FIG. 11 illustrates a sample subscription card. This sample subscription card contains a space for the subscriber's name, the subscriber's address, and the term of the subscription, as shown in FIG. 11. The sample subscription card may also contain the price for the term of subscription and may indicate alternative terms of subscription and prices.

Upon receiving the completed subscription card, the cashier at POS terminal 120 verifies that customer 110 correctly filled out the subscription card and imprints a validation mark on the subscription card (step 1030). The validation mark may include, for example, the signature of the cashier on the subscription card, a store stamp, a special label, a marking from printer 124, or any other indicia indicating that the consumer has paid for the subscription.

Following validation, the cashier at POS terminal 120 scans a bar code on the single issue using a bar code reader connected to POS terminal 120. By scanning the single issue, POS terminal 120 captures the identification of the periodical title and the single-issue price pursuant to the Uniform Produce Code (UPC), or bar code, located on the periodical issue (step 1040). To indicate the selection of a subscription, the cashier at POS terminal 120 presses a preprogrammed key on POS terminal 120 to indicate that the sale of a subscription has occurred and to obtain an authentication code (step 1050). POS terminal 120 may download a plurality of authentication codes from local authentication code database 344 and temporarily store them in data storage device 240 to be accessed, or alternatively, POS terminal 120 may request an authentication code from POS controller 122 after the preprogrammed key has been pressed. Following the indication of a subscription, POS terminal 120 displays a query to the cashier requesting information about the subscription term and price, which the cashier enters into POS terminal 120 (step 1060). At this or a later time, the cashier may insert the subscription card into printer 124 to have the authentication code imprinted on it. The cashier at POS terminal 120 collects the price for the subscription customer 110 and causes printer 124 to print a receipt with the authentication code (step 1070). Customer 110 pays for the subscription in the same manner as any retail purchase, such as cash, credit card, personal check, or other form of credit or payment. The cashier at POS terminal 120 then delivers the printed receipt to customer 110 (step 1080).

FIG. 12 illustrates an example of this receipt, which contains certain subscription information. The subscription information includes an authentication code and customer service information, including an 800 customer service number. In an alternative embodiment, the cashier at POS terminal 120 provides customer 110 with a preprinted card indicating the authentication number and customer service information.

Figure 13A:
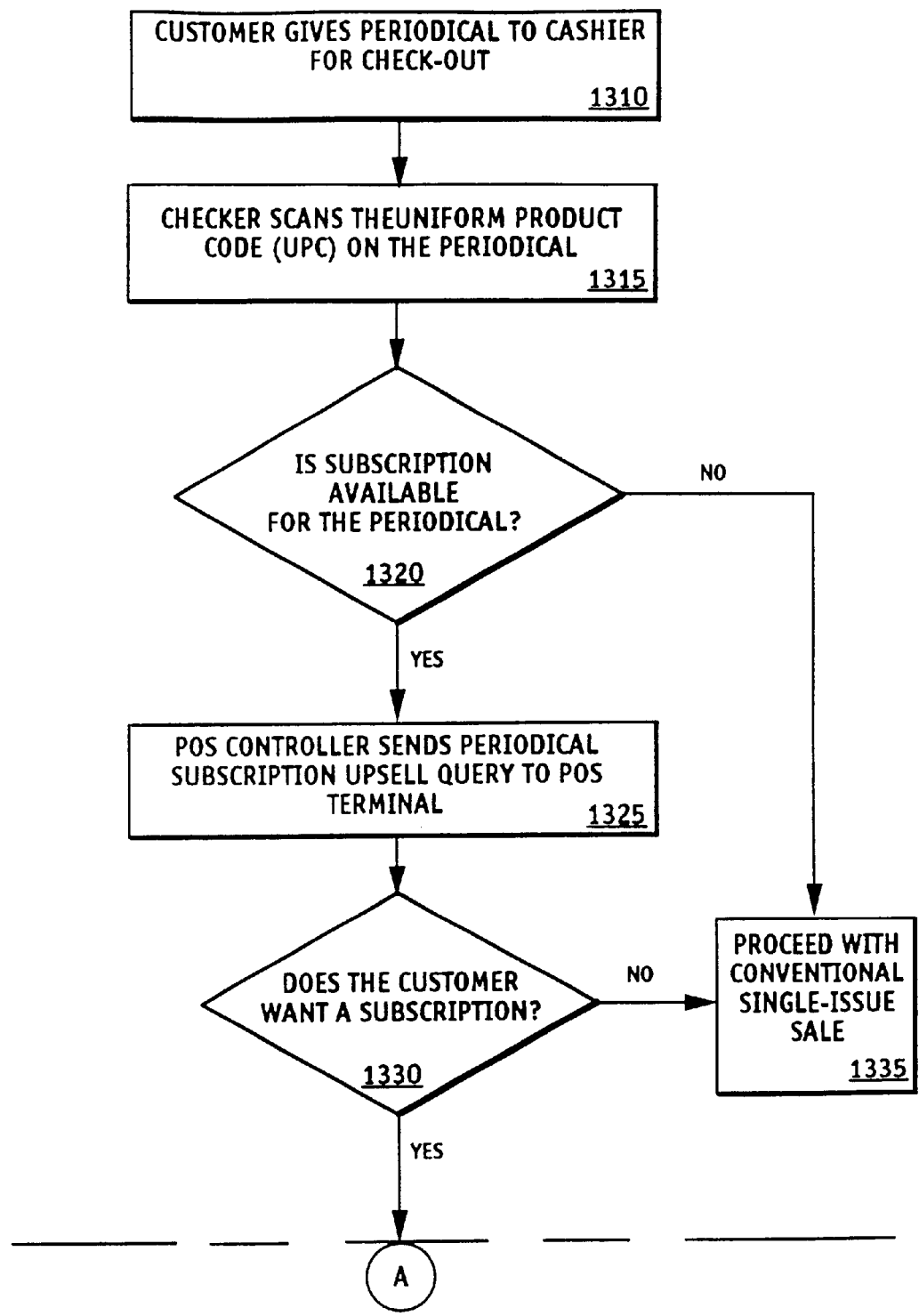
FIGS. 13A and 13B illustrate flow diagrams of a method for establishing a subscription through a retail channel, in accordance with a second embodiment of the invention.
Figure 13B:
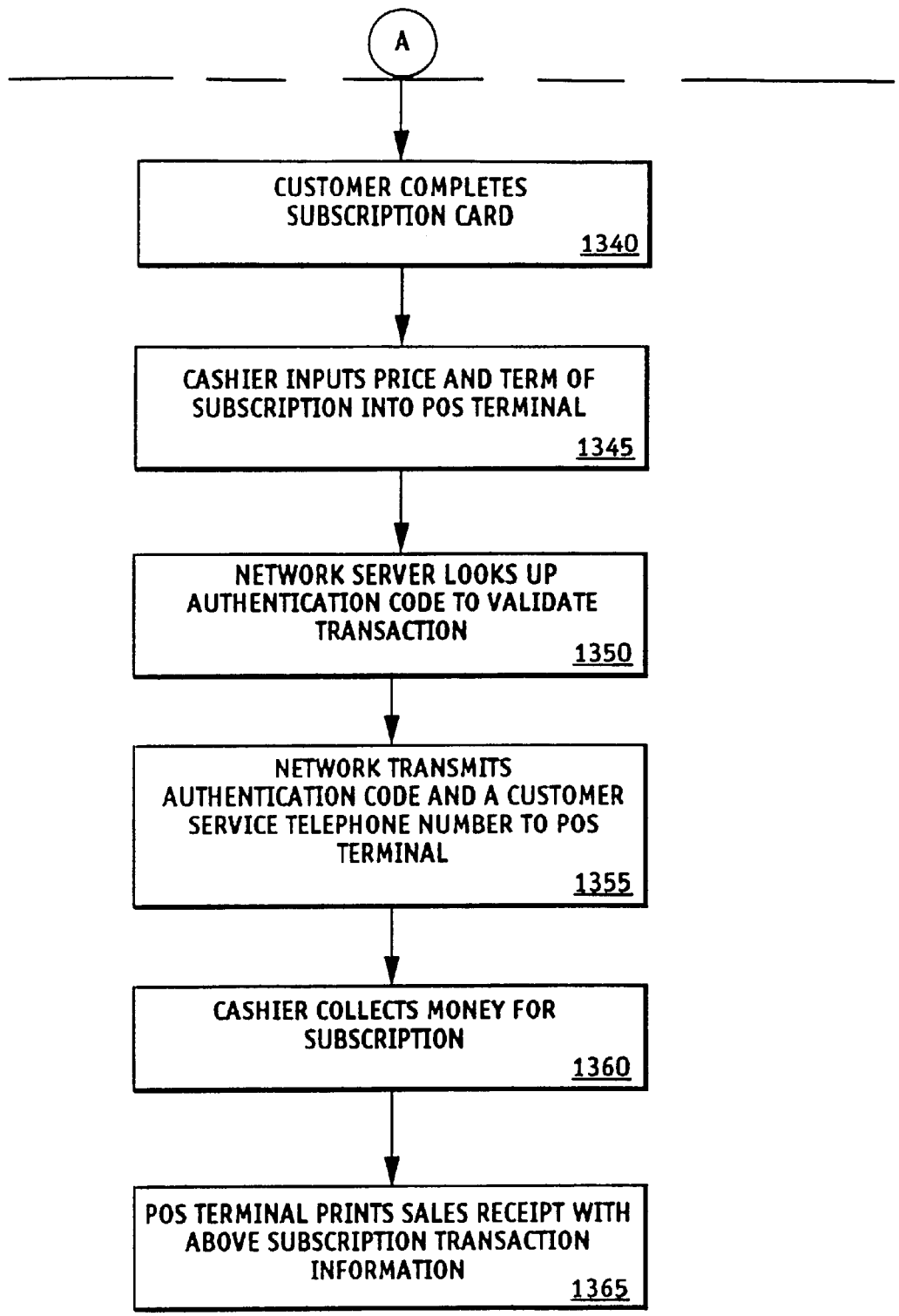

FIGS. 13A–13B illustrate a flow diagram representing another embodiment for establishing a subscription pursuant to a single-issue sale. In this embodiment, POS terminal 120 is in continuous electronic communication with POS controller 122. Customer 110 selects a single issue of a periodical and gives the periodical to the cashier at POS terminal 120 for purchase (step 1310). The cashier at POS terminal 120 scans the single issue to collect data from the UPC code, or bar code (step 1315). POS terminal 120 transmits the bar code data to POS controller 122 to determine whether a subscription is available for the periodical associated with the bar code data (step 1320). If not, the cashier proceeds with a conventional single-issue sale (step 1335). If a subscription is available, POS controller 122 sends a periodical subscription upsell query to POS terminal 120 (step 1325). That is, POS terminal 120 displays on display device 250 of POS terminal 120 a message informing the cashier that a subscription is available for the periodical. Pursuant to this prompt, the cashier at POS terminal 120 asks customer 110 whether he desires a subscription to the periodical (step 1330). If the customer responds in the negative, the cashier at POS terminal 120 proceeds with a conventional single-issue sale (step 1335).

Continuing on FIG. 13B, if the customer responds affirmatively, the cashier at POS terminal 120 requests that customer 110 complete a subscription card, which the customer may obtain from the single-issue periodical or from the cashier (step 1340). After customer 110 has completed the subscription card, the cashier at POS terminal 120 inputs into POS terminal 120 the subscription term and price from the subscription card (step 1345). POS terminal 120 then transmits data indicating the sale of a subscription to POS controller 122, and POS controller 122 retrieves an authentication code for the sale from local authentication code database 344 (step 1350).

POS controller 122 records subscription information in local sales database 346 and transmits the subscription information, including the authentication code and customer service telephone number, to POS terminal 120 (step 1355). At this or a later time, the cashier at POS terminal 120 may insert the subscription card into printer 124 to have the authentication code imprinted on it. The cashier at POS terminal 120 then collects the amount due for the subscription from customer 110 (step 1360). Upon indication of payment to POS terminal 120, printer 124 prints a receipt for the transaction, which the cashier delivers to customer 110 (step 1365). As in the previous embodiment described in connection with FIG. 12, the receipt includes an authentication code and customer service information.

Figure 14:
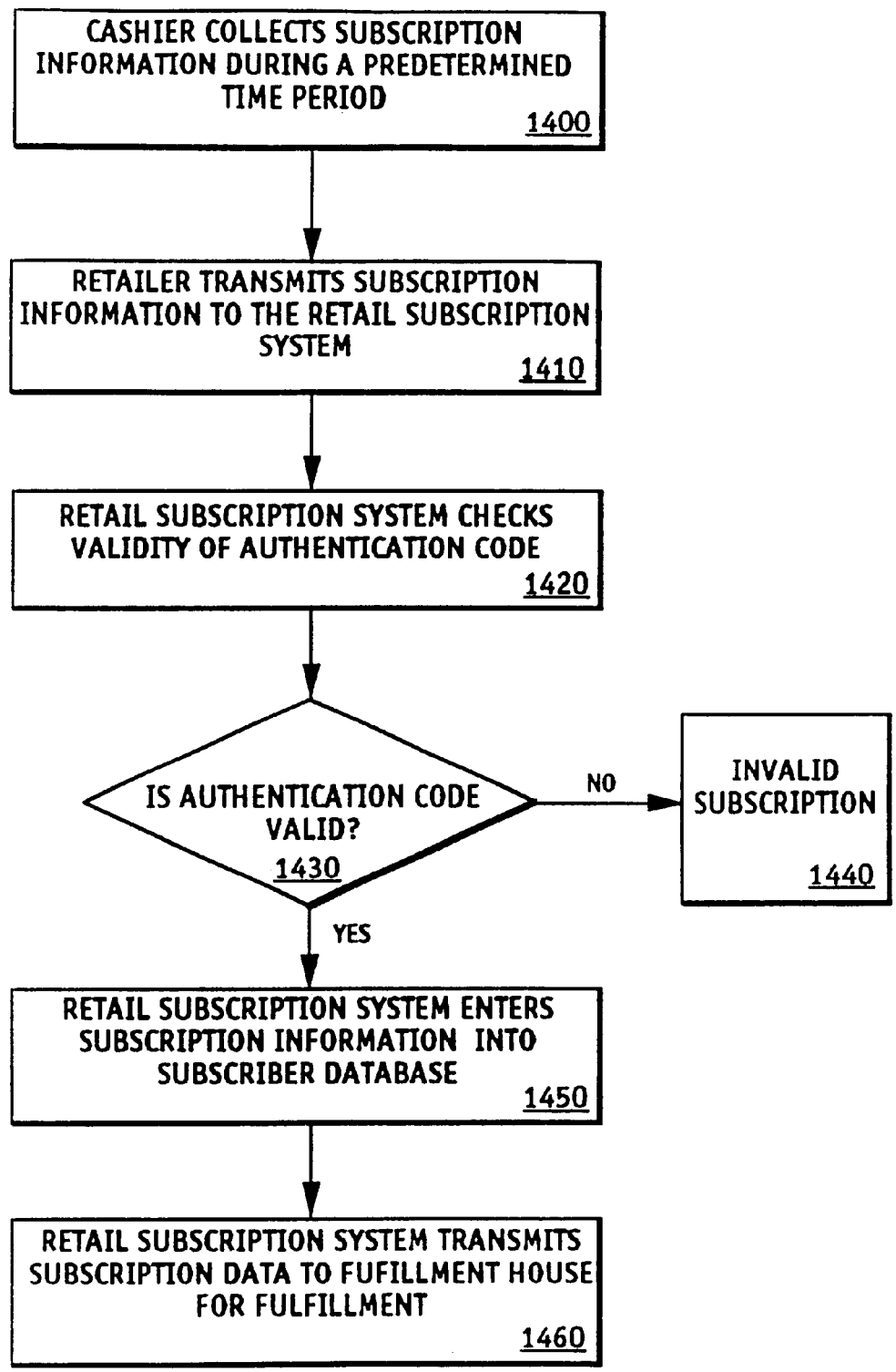
FIG. 14 illustrates a flow diagram of a method for establishing a subscription at the retail subscription system, in accordance with one embodiment of the invention.

FIG. 14 illustrates a process for retail subscription system 130. A cashier at POS terminal 120 collects subscription information over a predetermined time period, such as, for example, on a daily or weekly basis (step 1400). At the end of this period, the retailer transmits the subscription information to retail subscription system 130 (step 1410). As discussed above, this may be done by bundling subscription cards completed by customers purchasing subscriptions over the course of a predetermined time period and mailing the bundle of subscription cards to retail subscription system 130. Alternatively, this may be done electronically, such as, for example, over a modem. Upon receiving the subscription information, retail subscription system 130 checks the authenticity of the authentication code associated with each subscription sale (step 1420). As described above, retail subscription system 130 validates authentication codes by comparing the authentication codes sent with the subscription information with the authentication codes stored in RSSAC database 444.

If the authentication code is invalid, retail subscription system 130 rejects the subscription as invalid (step 1440). If the authentication code is valid (step 1430), retail subscription system 130 accepts the subscription and enters the subscription information into subscriber database 442 (step 1450). After a predetermined time, retail subscription system 130 transmits information contained in subscriber database 442 to fulfillment house 140 (step 1460).

Figure 15:
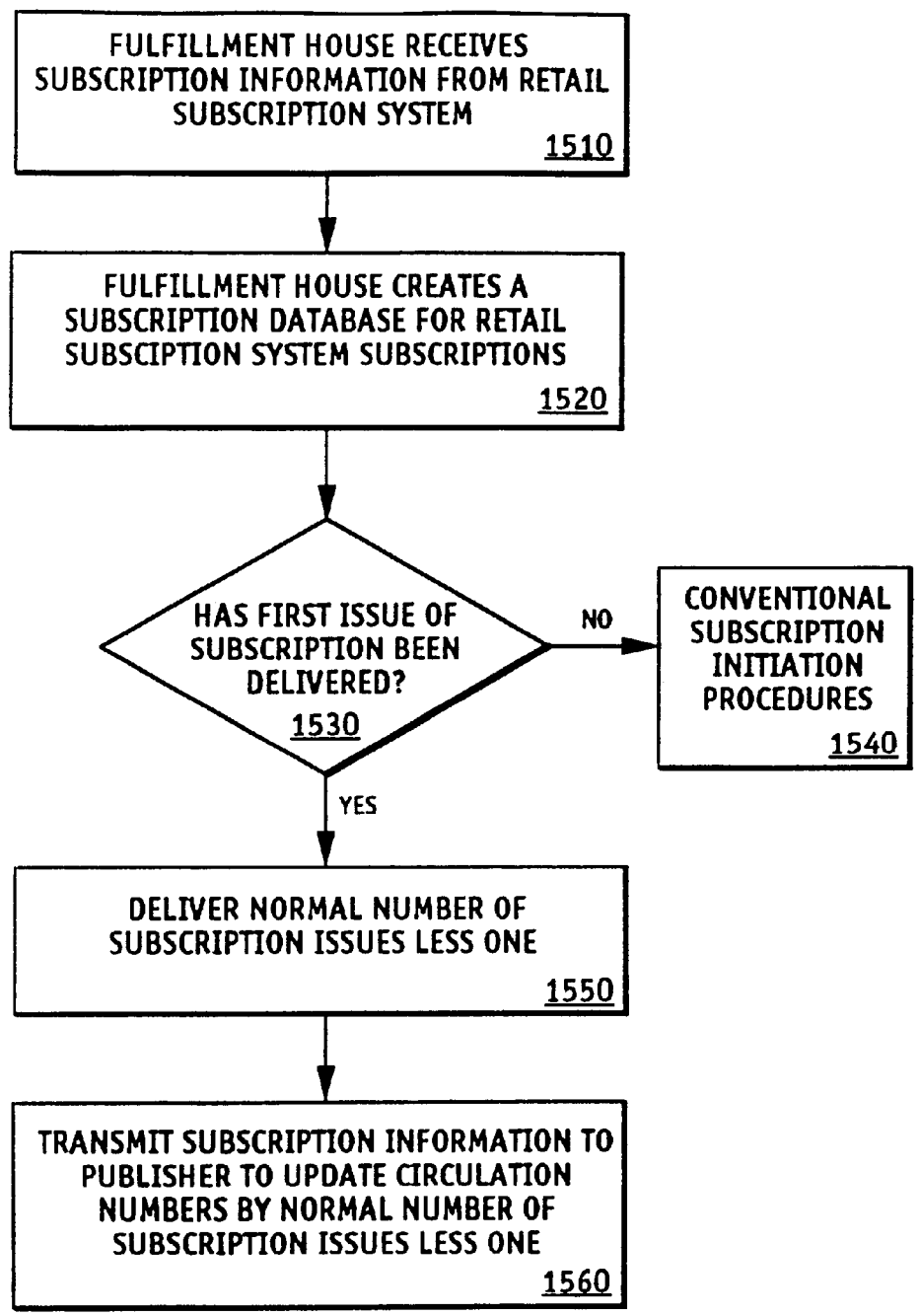
FIG. 15 illustrates a flow diagram of a method for establishing a subscription at the fulfillment house, in accordance with one embodiment of the invention.

FIG. 15 illustrates a fulfillment process of the invention. In accordance with this fulfillment process, fulfillment house 140 receives subscription information transmitted from retail subscription system 130 (step 1510). Upon receipt of the subscription information, fulfillment house 140 creates, or modifies, a record in a subscription database (step 1520). Fulfillment house 140 then determines from the data contained within the subscription database whether a single issue of the subscription was delivered during the sale of the subscription (step 1530). If not, fulfillment house 140 processes a conventional subscription (step 1540). If so, fulfillment house 140 instructs the subscription database to deliver the normal number of subscription issues less one issue (step 1550). Additionally, fulfillment house 140 transmits to the publisher of the periodical the subscription information relating to customer 110 to update circulation numbers (1560).

Figure 16:
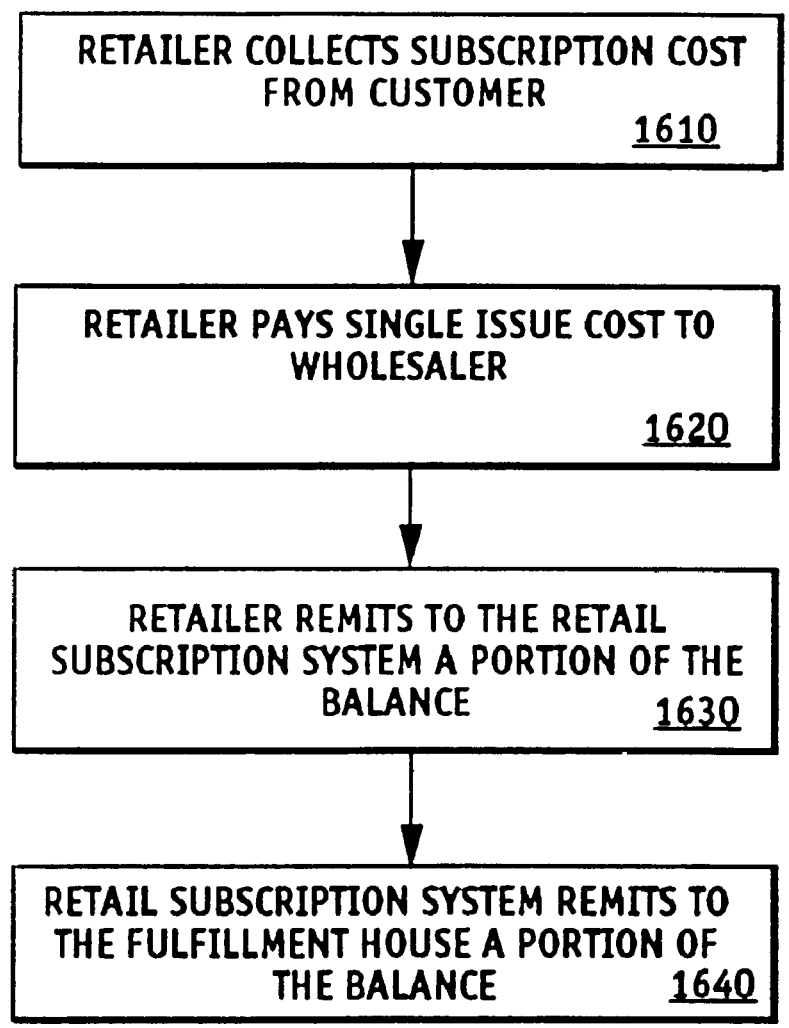
FIG. 16 illustrates a flow diagram of a method for processing the subscription payment from the point-of-sale to the retail subscription system and then to the fulfillment house, in accordance with one embodiment of the invention.

FIG. 16 illustrates a process for transacting and tracking a subscription payment in accordance with one embodiment of the invention. This process includes the transaction of a payment from a POS terminal location, to a retail subscription system, and to a fulfillment house. In accordance with this payment process, a cashier at POS terminal 120 collects payment for a subscription from customer 110 based upon the subscription price (step 1610). From this subscription payment, the retailer at the POS terminal location pays the cost of the single issue to the wholesaler (step 1620). From the remainder of the subscription payment, the retailer then retains a percentage and, based on the same time period for the transmittal of subscription information, remits the balance of the payment to retail subscription system 130 (step 1630). From the balance of the subscription payment remitted to retail subscription system 130, retail subscription system 130 retains a percentage and correspondingly remits the balance to fulfillment house 140 (step 1640). In alternative embodiments, payment collected at POS terminal 120 for the sale of a subscription may be distributed among the different parties according to predetermined methodologies.

Conclusion

The system of the invention provides for the retail sale of subscriptions to periodicals. This system provides for the sale of subscriptions in a retail environment, where a customer has initiated the purchase of a single issue of a periodical. This subscription methodology provides many advantages over the traditional subscription methodologies.

It will be apparent to those skilled in the art that various modifications and variations can be made in the system and processes of the present invention without departing from the spirit and scope of the invention. Thus, it is intended that the present invention cover all modifications and variations of the invention within the scope of the appended claims.

What is claimed is:

1. A method of initiating a subscription to a periodical from a retail subscription system, comprising the steps of:

receiving a completed subscription card indicating that a subscription to a periodical was sold, the subscription card containing subscription information and a code that indicates a merchant from which the subscription was sold;

comparing the code contained on the subscription card with codes stored in a database;

determining that the code contained on the subscription card is valid if the code contained on the subscription card matches at least one of the codes stored in the database; and transmitting subscription information from the subscription card to a fulfillment house to initiate the subscription if the code on the subscription card is determined valid.

2. The method according to claim 1, further comprising storing the subscription information from the subscription card into a database.

3. The method according to claim 1, wherein the subscription information contains data indicating whether the sale of the subscription included distribution of a single issue of the periodical.

4. The method of claim 1, further comprising:

storing an indication of an amount owed to the retail subscription system from the merchant, the amount owed being approximately equal to the cost of subscription.

5. A computer program product comprising:

a computer usable medium having computer readable code embodied therein for initiating a subscription to a periodical from a retail subscription system, the computer usable medium comprising:

a receiving module configured to receive a completed subscription card indicating that a subscription to a periodical was sold, the subscription card containing subscription information and a code that indicates a merchant from which the subscription was sold;

a comparing module configured to compare the code contained on the subscription card with codes stored in a database;

a determining module configured to determine that the code contained on the subscription card is valid if the code contained on the subscription card matches at least one of the codes stored in the database; and a transmitting module configured to initiate transmission of subscription information from the subscription card to a fulfillment house to initiate the subscription if the code on the subscription card is determined valid.

6. A system for initiating a subscription to a periodical from a retail subscription system, comprising:

means for receiving a completed subscription card indicating that a subscription to a periodical was sold, the subscription card containing subscription information and a code that indicates a merchant from which the subscription was sold;

means for comparing the code contained on the subscription card with codes stored in a database;

means for determining that the code contained on the subscription card is valid if the code contained on the subscription card matches at least one of the codes stored in the database; and means for transmitting subscription information from the subscription card to a fulfillment house to initiate the subscription if the code on the subscription card is determined valid.

7. A system for initiating a subscription to a periodical from a retail subscription system, comprising:

a receiving component configured to receive a completed subscription card indicating that a subscription to a periodical was sold, the subscription card containing subscription information and a code that indicates a merchant from which the subscription was sold;

a comparing component configured to compare the code contained on the subscription card with codes stored in a database;

a determining component configured to determine that the code contained on the subscription card is valid if the code contained on the subscription card matches at least one of the codes stored in the database; and a transmitting component configured to transmit subscription information from the subscription card to a fulfillment house to initiate the subscription if the code on the subscription card is determined valid.

8. The system of claim 7, further comprising a storing component configured to store the subscription information from the subscription card into a database.

9. The system of claim 7, wherein the subscription information contains data indicating whether the sale of the subscription included distribution of a single issue of the periodical.

\* \* \* \* \*